(12) United States Patent
Muthuswamy et al.

(10) Patent No.: US 6,606,525 B1
(45) Date of Patent: Aug. 12, 2003

(54) SYSTEM AND METHOD OF MERGING STATIC DATA IN WEB PAGES

(75) Inventors: Sivakumar Muthuswamy, Plantation, FL (US); Anupama Ramamurthy, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/472,285

(22) Filed: Dec. 27, 1999

(51) Int. Cl.$^7$ ............................................. G05B 13/02
(52) U.S. Cl. .............................. 700/52; 700/55; 700/73; 709/201; 709/203; 709/217; 709/225; 707/2; 707/104.1; 707/6
(58) Field of Search ........................... 700/2, 3, 5, 17, 700/19, 20, 52, 53, 55, 73; 707/2–4, 10, 104.1, 513, 501.1, 515, 6; 709/201–203, 217–225, 229, 230, 238, 310

(56) References Cited

U.S. PATENT DOCUMENTS

| | | | |
|---|---|---|---|
| 5,859,972 A | * 1/1999 | Subramaniam et al. | 707/10 |
| 5,946,458 A | * 8/1999 | Austin et al. | 358/1.15 |
| 5,963,925 A | * 10/1999 | Kolling et al. | 705/27 |
| 5,991,809 A | * 11/1999 | Kriegsman | 709/226 |
| 6,018,748 A | * 1/2000 | Smith | 707/501.1 |
| 6,026,413 A | * 2/2000 | Challenger et al. | 707/10 |
| 6,167,358 A | * 12/2000 | Othmer et al. | 702/188 |
| 6,253,326 B1 | * 6/2001 | Lincke et al. | 380/255 |

\* cited by examiner

*Primary Examiner*—Ramesh Patel
(74) *Attorney, Agent, or Firm*—Frank Saitch

(57) ABSTRACT

A system and method for merging static data and dynamic data downloaded to a browser from a network site of a network, preferably being a website on the Internet. The system includes at least one server in communication with the network, and the server hosts one or more network sites that include static data and dynamic data. The system further includes at least one user computer in communication with the network with a browser on the user computer that selectively interacts with network sites and selectively downloads the static data and dynamic data from the interacted network site. The user computer stores the static data and dynamic data in a local data store and recognizes the static data and dynamic data, preferably through marking with pointers, and upon refreshing of the downloaded data being requested, the user computer downloads dynamic data from the network site. The system provides a method including the steps of downloading static and dynamic data to the user computer from an interacted network site, recognizing the static data and dynamic data, storing the static data and dynamic data in a local data store of the user computer, requesting the refreshing of all downloaded data on the user computer from the network site, and downloading the dynamic data from the network site.

14 Claims, 6 Drawing Sheets

| ABC Company, Inc. (NYSE: ABC) | | | |
|---|---|---|---|
| Last Trade | Change | Prev Cls | Volume |
| 3:57PM–82 | +3–3/8(+4.27%) | 79 | 4,940,200 |
| Days' Range | Bid | Ask | Open | Avg Vol |
| 80–82–3/4 | N/A | N/A | 81–1/4 | 3,454,363 |
| 52-week Range | Earn/Shr | P/E | Mkt Cap | Div/Shr |
| 38–3/8–88–7/8 | –1.63 | N/A | 49.672B | 0.48 |
| | | | | Div Date | Jul 15 |
| | | | | Ex-Div | Jun 11 |
| | | | | Yield | 0.61 |

| 3:57PM-82 | +3-3/8(+4.27%) | | 79 | 4,940,200 | Jul 15 |
|---|---|---|---|---|---|
| 80-82-3/4 | N/A | N/A | 81-1/4 | 3,454,363 | Jun 11 |
| 38-3/8-88-7/8 | -1.63 | N/A | 49.672B | 0.48 | 0.61 |

*FIG. 5*

SYSTEM AND METHOD OF MERGING STATIC DATA IN WEB PAGES

BACKGROUND OF THE INVENTION

1. Field of the Invention

The present invention generally relates to computer systems and networks. More particularly, the present invention relates to a system and method for merging static data with dynamic data from the same web page of a website on the Internet.

2. Description of the Related Art

Web servers on the Internet provide websites that have graphic web pages, typically implemented in hypertext mark-up language (HTML), which are accessible to user computers that are in connection to the Internet. A user computer uses a "browser" program that allows the user to download the web display the web pages on the user computer to the user. The web pages can have static data that remains unchanged, such as in a background, and dynamic data which changes on the web page, such as stock quotes or weather. In typical database-driven/data-focused web page applications on the Internet, 50–70% of the web page content is static information.

When the combined static and dynamic data of the web page is downloaded, the dynamic data must periodically be "refreshed," or reloaded, on the downloaded web page to accurately reflect any changed data. In order to view a web page that has both static and dynamic data, a browser must constantly download the web page data and update the already downloaded web page. One method of refreshing the web page on the browser is to include a "refresh metatag" in the web page that instructs the browser to update the web page at a predetermined time interval. This method, however, must be provided by the web site host and cannot be controlled by the user computer.

For the user computer to control refreshing of the downloaded web page, a conventional browser can simply reload the entire web page once the dynamic data is requested to be refreshed, but this total reload is slow and takes significant system resources. Some browsers attempt to increase efficiency through the use of a caching scheme to store the entire mixed-data HTML web page when the web page is downloaded to the browser. When the web page is desired to be refreshed, the browser downloads the entire web page again, except for the image files used in the web page that are already in the cache, and updates the web page on the user computer. However, both of the above methods do not discriminate between the static and dynamic data of the website for purposes of updating the web page downloaded on to the browser. Accordingly, the present invention is primarily directed at providing an improved system and method for merging static data and dynamic data on the browser of the user computer.

BRIEF DESCRIPTION OF THE DRAWINGS

FIG. 3 is the specific web page shown in FIG. 2, illustrating a static data layer and a dynamic data layer merged in a single web page document.

FIG. 5 is the dynamic data layer of the web page document of FIG. 3, and the dynamic data layer is shown as overlaying the static data layer of FIG. 4.

DETAILED DESCRIPTION OF THE INVENTION

Figure 1:
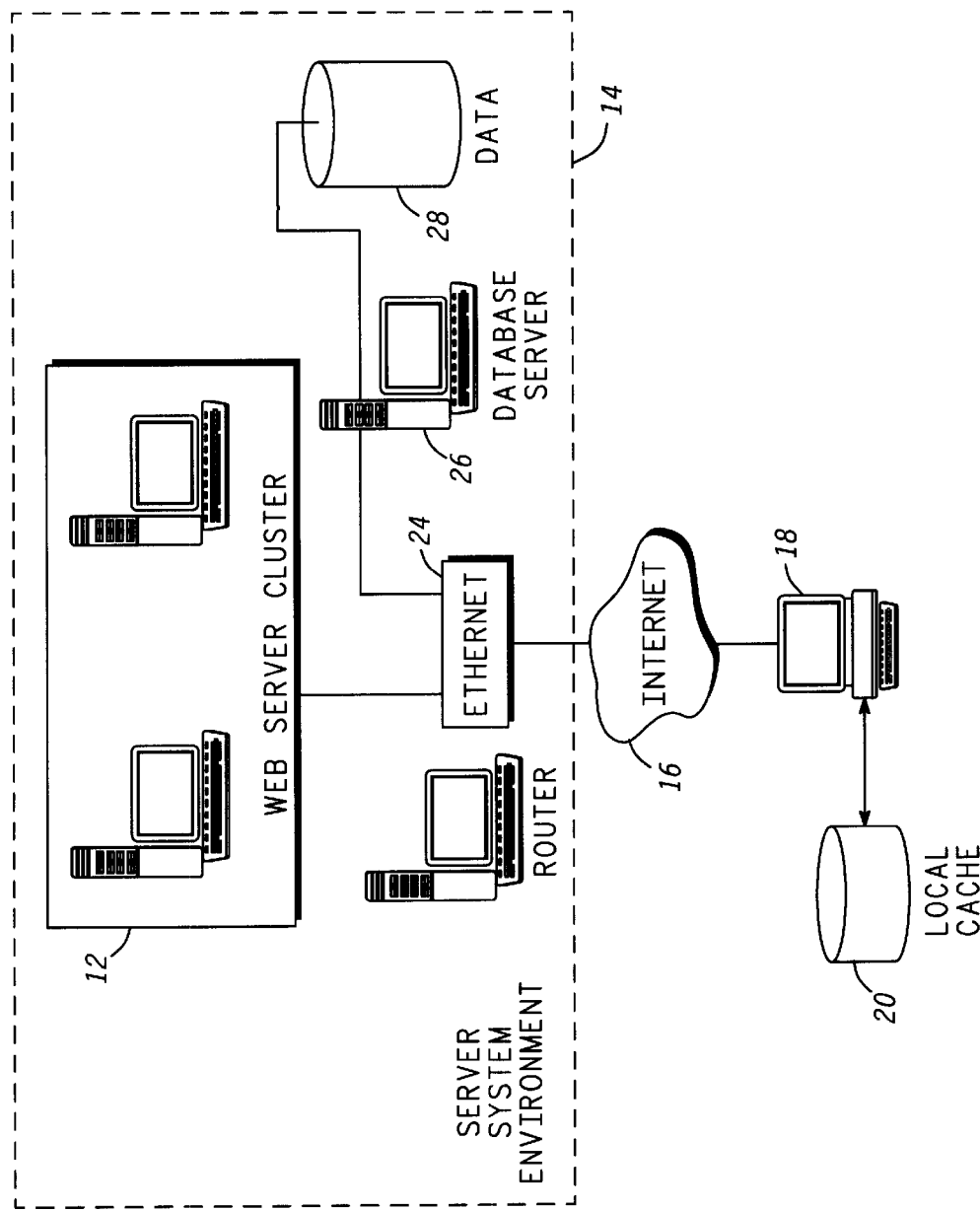
FIG. 1 is a representative diagram of one or more servers and one or more user computers interconnected through the Internet.

Referring now to the drawings, in which like numerals represent like components throughout the several drawings, FIG. 1 is a representative diagram of a system of one or more servers, a plurality of web servers shown as web server cluster 12, in a server system environment 14, and one or more user computers, shown as user computer 18, all of which are interconnected through a network, such as the Internet 16. The user computer 18 includes a local data store, shown as a local cache 20 in the user computer 18. The server system environment 14 is shown in a common configuration as known in the art, with the web server cluster 12 connected to a central ethernet 24 (or other local area network), with a database server 26 and database 28 in connection therewith. The ethernet 24, or LAN, is typically controlled by a router, and bridges a connection to the Internet 16.

Figure 2:
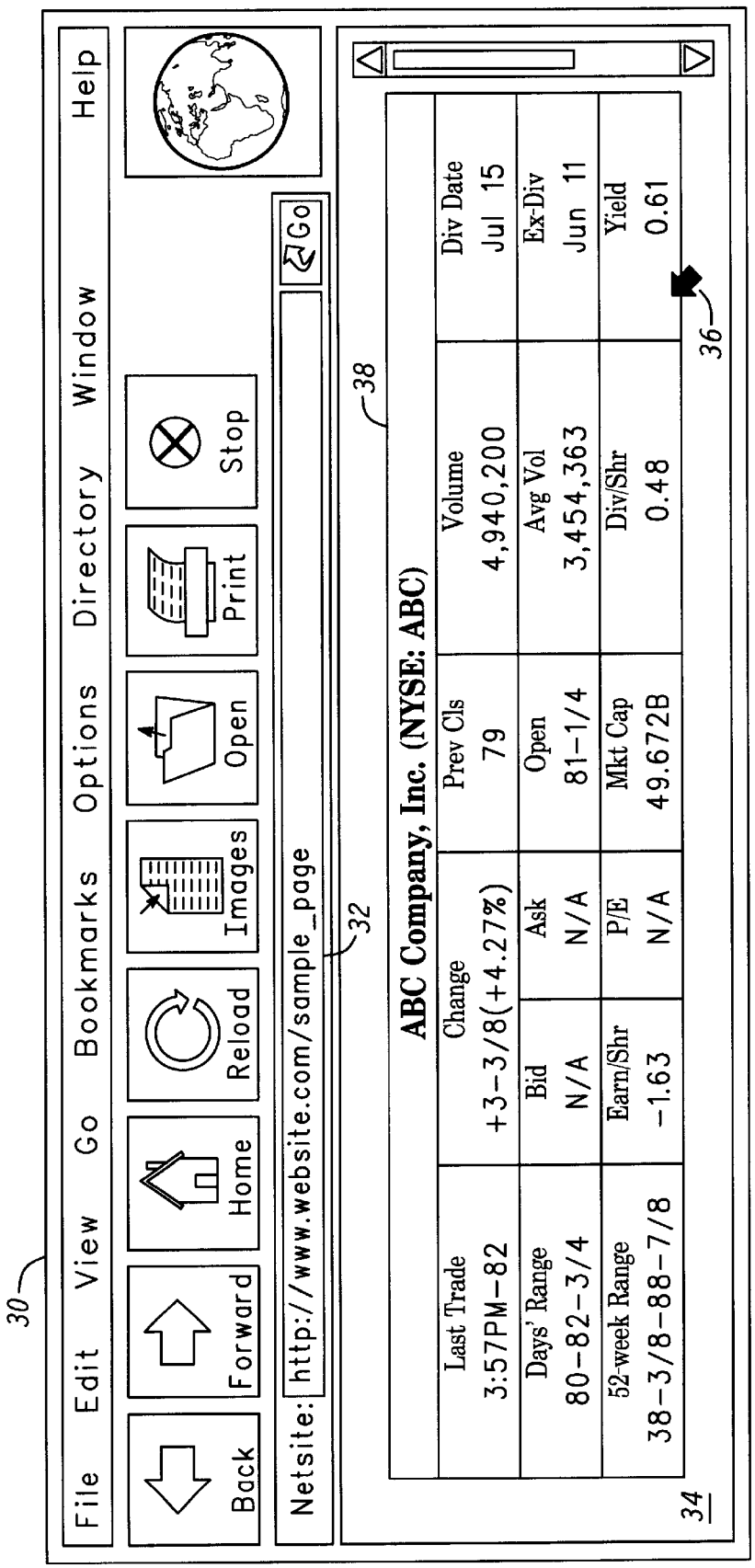
FIG. 2 is a graphic view of a browser GUI display for an exemplary website having a web page that includes both static and dynamic data.

With reference to FIG. 2, the user computer 18 has a browser which has a browser GUI display 30 that allows the user computer 18 to go to a website 32 hosted by one of the web servers of the web server cluster 12. The browser GUI display 30 can display the web page 34 of the website 32 and provides a cursor 36 to interact with the web page 34 and the browser GUI display 30. On the web page 34, there can appear one or more documents, such as stock chart 38 that is comprised of both a static data layer and a dynamic data layer. The specific stock chart 38 is specifically shown in FIG. 3.

Figure 4:
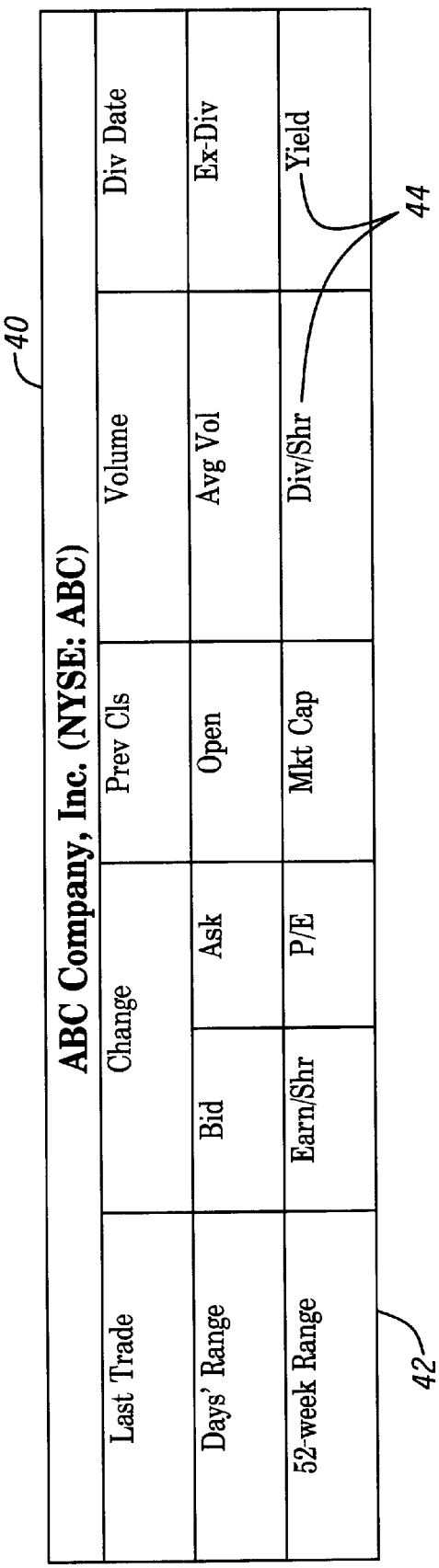
FIG. 4 is the static data layer of the web page document of FIG. 3.

The stock chart 38 of FIG. 3 is constructed in layers in HTML, as is common for most web documents. FIG. 4 illustrates the static data layer 40 of data for the stock chart 38, including such things as the overall visual table 42 and value descriptions 44 for the various cells. The dynamic data layer 46 of data, which is shown in FIG. 5, comprises various stock information and overlays the static layer 40 to form the merged document of the stock chart of FIG. 3.

The web-browsing architecture on the user computer 18 thus effectively combines the static and dynamic content of HTML files to achieve highly efficient web page downloads during web browsing. The present invention can be constructed by authors with existing commercial browsers, such as Netscape Navigator and Internet Explorer, which incorporate a "layer model" as part of their cascading style sheet scheme to provide fine control of document formatting for the authors. The browser can divide the layer model to separate static and dynamic content and merge them during the page rendering process. This method of separating all the static and dynamic elements of an HTML document into different layers and merging them has a key advantage over the conventional method of downloading the entire file and rendering, in that the reduction in transmitted file size during the refreshing operation reduces the bandwidth needed to download web documents generally. This method also increases the speed at which the downloaded web page can be refreshed with the dynamic data from the web page of the web site.

Figure 6:
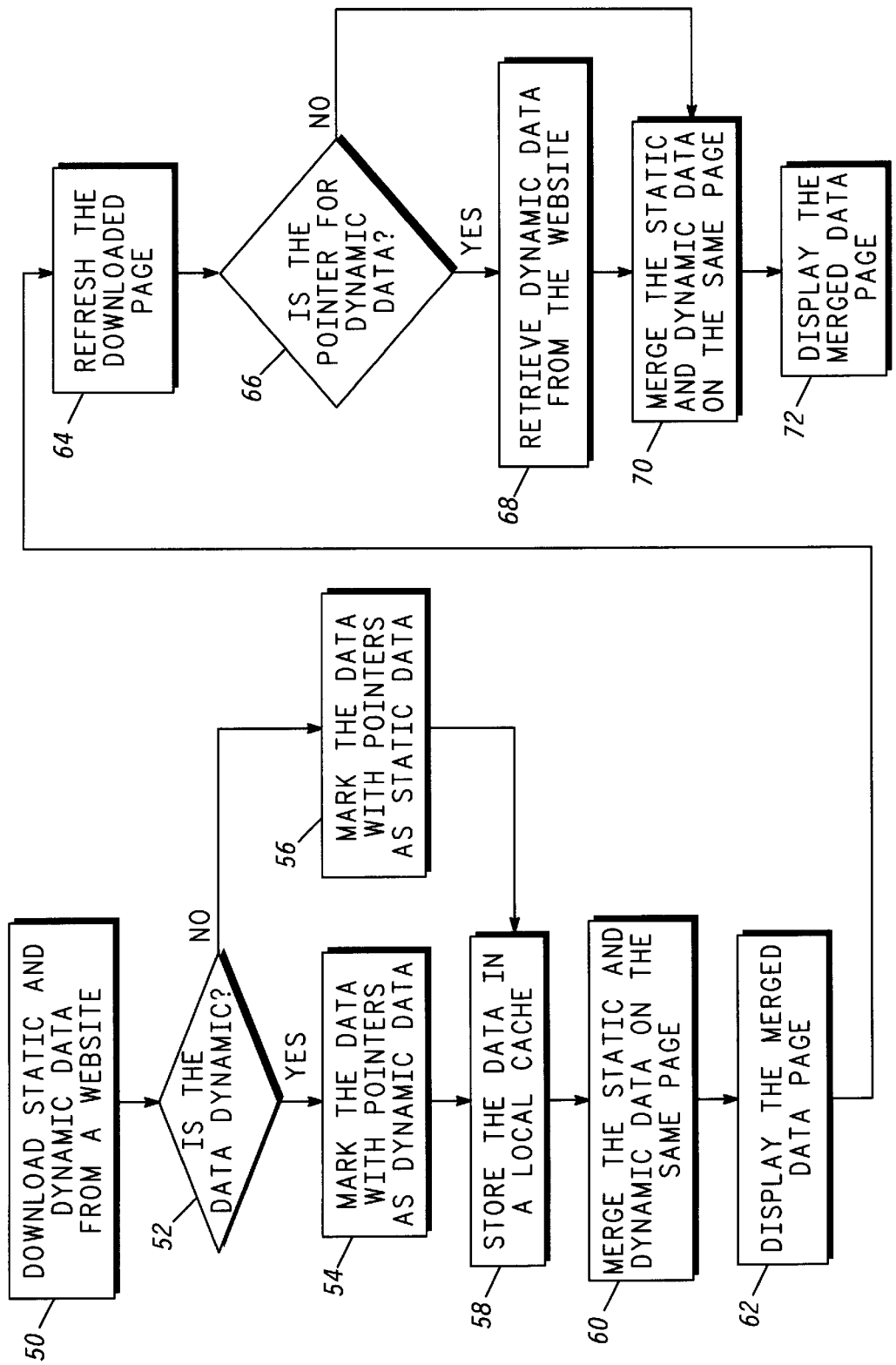
FIG. 6 is a flowchart illustrating the process of downloading, displaying, and refreshing a web page having static data and dynamic data according to the present invention.

The preferred process for downloading and refreshing network sites from a network is shown in the flowchart of FIG. 6, which illustrates the downloading and refreshing of a web page from the Internet 16 to a user computer 18, where the web page includes static and dynamic data. The static and dynamic data representing the web page is downloaded to the user computer 18, shown at block 50, and then a decision is made as to whether the data is dynamic data, shown at decision 52. If the data is dynamic data, then the data is preferably marked with pointers as dynamic data, shown at block 54, and if the data is not dynamic data, it is then marked with pointers indicating that it is static data, shown at block 56. After the data is preferably marked with the relevant pointers, it is stored in a local data store of the user computer, such as local cache, shown at block 58. Then the static data and dynamic data are merged on the same page, shown at block 60, to essentially recreate the downloaded web page on the browser, and the merged page is displayed on the user computer, shown at block 62.

It should be noted that the step of marking the data is not critical to the present invention, rather, the key issue is that user computer 18 can recognize and differentiate the static and dynamic data stored in the local data store at the time refreshing of the downloaded web page. Thus, other methods for distinguishing data as known in the art can utilized by the browser to distinguish the static data and dynamic data. There are other methods known in the art which can implement the present invention. For example, new tags in the HTML file on the web server can be added that identifies the static and dynamic data and the browser can sort the tags to refresh the dynamic data of the downloaded web page. In this implementation, each of the dynamic data fields has a unique identifier that serves as the reference for the browser during refreshing operations, and thus, the system does not require a cascading style sheet or HTML layer capable browser. Furthermore, the tagging of the data can be implemented either at the web server or at the user computer 18.

Another method to distinguish the data is to define a new data structure and file format for HTML files such that the static and dynamic contents are separated into two different files. When refreshing of the downloaded web page is requested, only the dynamic content file is downloaded from the web server. This embodiment eliminates the need for the user computer to sort through the data from a the downloaded web page and add pointers to dynamic and static content as the web server does the work of sorting dynamic and static content. The user computer then simply requests the dynamic data file instead of comparing the static and dynamic data in the local cache.

Referring again to FIG. 6, when refreshing of the downloaded web page is requested, shown at block 64, a comparison of the data in the local cache is made as to whether the stored data is dynamic data, shown at decision 66. If the data is identified as dynamic data, then the corresponding dynamic data on the website is again retrieved, shown at block 68, and if the data is not dynamic data, then it is not retrieved from the website. The static data determined by decision 66 and the dynamic data again downloaded from the website (block 68) are merged on to the same web page downloaded on the user computer, shown at block 70, and the merged page is displayed to the user, shown at block 72. Thus, the web page is refreshed with the current dynamic data of the website reflected on the downloaded web page.

The process of marking the static and dynamic data can alternately be performed on the web server. In such embodiment, the user computer 18 has the capability to recognize the pointers as pertaining to a specific type of data during the comparison step (decision 66).

It can thus be seen that the present inventive system provides a method for merging static data and dynamic data downloaded from the network site of a network where the network, such as the Internet 16 as shown in FIG. 1, has at least one server in communication with therewith, such as web server cluster 12, and the server hosts one or more network sites where each network site includes static data and dynamic data. The network further has at least one user computer 18 in communication therewith and the user computer 18 includes a browser that selectively interacts with network sites. The method accordingly includes the steps of: downloading static and dynamic data, preferably from a web page 34 (FIG. 2) to the user computer 18 from an interactive network site, such as website 32 (FIG. 2); marking the static data and dynamic data; storing the static data and dynamic data in a local data store, such as a local cache 20 of the user computer 18; requesting the refreshing of all downloaded data on the user computer 18 from the network site, or website 32; and downloading the dynamic data from the network site.

The step of marking the static data and dynamic data preferably involves marking the static data and dynamic data with pointers as shown at blocks 54 and 56 of FIG. 6. If the static data and dynamic data are layered on the website, such as in HTML cascading sheets, then the step of downloading the dynamic data from the web site after requesting the reloading of all downloaded data involves downloading the dynamic layer of the web page 34 of website 32 on the Internet 16.

The method also preferably includes the step of comparing the marked data in the data store, or local cache 20, of the user computer 18 to determine the dynamic data to be downloaded from the network site to refresh the downloaded static data.

According to the present invention, the static content of a page will be associated with specific layers of a document which will remain the same between downloads. Special pointers will be implemented in the HTML document to identify static and dynamic layers. Whenever the rendering engine sees pointers for static layers, it will reuse static content from the cached version of the page instead of downloading it from the server. Only the dynamic portions of the document will be retrieved from the server when refreshing of the downloaded web page is requested. The browser will then merge the static and dynamic layers and render them for the refreshed web page on the browser.

An expiration rule is optionally added to each of the static layers within the cache of the browser to provide additional flexibility in managing and downloading the content of the web page. The expiration rule allows the static layer to have a predetermined duration for refreshing the layer. The browser will then refresh only unexpired static layers in its merge operations while requesting expired static layers from the website on the web server.

In an alternative embodiment, the dynamic data has frame placeholders, as are known in the art, on the downloaded web page that get refreshed at every download by new dynamic data. This scheme makes it easier to render the page and align the frames of the static and dynamic layers during the rendering process to create a merged web page on the browser.

It should be noted that the system architecture disclosed herein is optimized for specifying presentation and user interaction with the Internet on limited capability devices such as telephone modems and other wireless mobile terminals. This invention accordingly enables efficient web browsing in low bandwidth and high latency wireless environments as it conserves resources in the reloading of web pages.

While there has been shown preferred and alternative embodiments of the present invention, it is to be understood that certain changes may be made in the forms and arrangements of the components and steps of the inventive method without departing from the spirit and scope of the invention as set forth in the claims appended herewith.

What is claimed is:

1. A system for merging static data and dynamic data downloaded from a network site on a network, the system comprising:

at least one server in communication with the network, the server hosting one or more network sites where one or more of the network sites includes static data and dynamic data; and at least one user computer in communication with the network, the user computer including a browser that selectively interacts with the network sites, the user computer further selectively downloading the static data and dynamic data from an interacted network site, the user computer storing and recognizing the static data and dynamic data in a local data store of the computer, and upon refreshing of the downloaded data being requested, the user computer initiating a request to the at least one server to transmit only the dynamic data from the network site.

2. The system of claim 1, wherein:

the network is the Internet; and the static data and dynamic data are from a web page of a web site.

3. The system of claim 2, wherein the user computer further displays the web page of the website on the browser of the user computer.

4. The system of claim 1, wherein the user computer further marks the static data and dynamic data with pointers prior to storing the data in a local data store.

5. The system of claim 1, wherein the data store of the user computer is a local cache.

6. The system of claim 3, wherein the static data and dynamic data are layered on the web page of the web site, and upon refreshing of the downloaded data being requested, the user computer downloads the dynamic layer of the web page of the website on the Internet.

7. The system of claim 4, wherein the user computer compares the marked data in the data store to determine the dynamic data to be downloaded from the network site to refresh the downloaded static data.

8. A method for merging static data and dynamic data downloaded from the network site of a network, the network having at least one server in communication therewith, the server hosting one or more network sites where one or more network sites includes static data and dynamic data, and the network further having at least one user computer in communication therewith, the user computer including a browser that selectively interacts with the network sites, the method comprising the steps of:

downloading static data and dynamic data to the user computer from an interactive network site;

recognizing the static data and dynamic data by the user computer;

the user computer storing the static data and dynamic data in a local data store of the user computer;

requesting the refreshing of all downloaded data on the user computer from the network site;

initiating a request from the user computer to the at least one server to transmit only the dynamic data from the network site; and downloading the dynamic data from the network site to the user computer.

9. The method of claim 8, wherein:

the network is the Internet; and the step of downloading static and dynamic data to the user computer from an interacted network site comprises downloading static and dynamic data from a web page of a web site.

10. The method of claim 9, further including the step of merging the downloaded dynamic data with the static data stored in the local data store of the user computer to display the web page on the browser of the user computer.

11. The method of claim 8, wherein the step of recognizing the static data and dynamic data comprises marking the static data and dynamic data with pointers.

12. The method of claim 8, wherein the step of storing the static data and dynamic data in a local data store of the user computer is storing the static data and dynamic data in a local cache of the user computer.

13. The method of claim 10, wherein the static data and dynamic data are layered on the website, and the step of downloading the dynamic data from the web site after requesting the reloading of all downloaded data is downloading the dynamic layer of the website on the Internet.

14. The method of claim 11, further comprising the step of comparing the marked data in the data store of the user computer to determine the dynamic data to be downloaded from the network site to refresh the downloaded static data.

* * * * *